(12) United States Patent
Anderson et al.

(10) Patent No.: US 8,768,746 B2
(45) Date of Patent: *Jul. 1, 2014

(54) TARGET MARKETING

(71) Applicant: International Business Machines Corporation, Armonk, NY (US)

(72) Inventors: James R. Anderson, San Francisco, CA (US); Mark Steven Ramsey, Kihei, HI (US); David Alec Selby, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,063

(22) Filed: Jun. 10, 2013

(65) Prior Publication Data

US 2013/0268322 A1 Oct. 10, 2013

Related U.S. Application Data

(63) Continuation of application No. 12/255,072, filed on Oct. 21, 2008, now Pat. No. 8,473,327.

(51) Int. Cl.
G06Q 30/02 (2012.01)
(52) U.S. Cl.
CPC .................................. G06Q 30/0204 (2013.01)
USPC ...................... 705/7.33; 705/14.49; 705/14.66
(58) Field of Classification Search
CPC .............. G06Q 30/02; G06Q 30/0204; G06Q 30/0241; G06Q 30/0251; G06Q 30/0269
USPC ........................ 705/14.4, 14.43, 14.49, 14.66
See application file for complete search history.

(56) References Cited

U.S. PATENT DOCUMENTS 5,870,752 A * 2/1999 Gibbons et al. ........................ 1/1
6,018,738 A    1/2000 Breese et al.
(Continued)

FOREIGN PATENT DOCUMENTS

WO      00/34910     6/2000
WO      0129692      4/2001
(Continued)

OTHER PUBLICATIONS

Meadows, M., & Dibb, S. (1998). Assessing the implementation of market segmentation in retail financial services. International Journal of Service Industry Management, 9(3), 266-285. Retrieved from http://search.proquest.com/docview/233662276?accountid=14753.*

(Continued)

*Primary Examiner* — Johnna Loftis
*Assistant Examiner* — Alissa Karmis
(74) *Attorney, Agent, or Firm* — Schmeiser, Olsen & Watts; John R. Pivnichny

(57) ABSTRACT

A marketing method and system. The method includes receiving by a computing system total population data. A peer group is selected from the total population data. The peer group is associated with a first marketing action. A list of attributes characterizing the peer group is generated. The attributes are associated with the marketing action, demographic data, and additional purchasing habits of the peer group. A target group of individuals of the total population data is selected. The attributes are associated with the individuals of the target group. Scores associated with the individuals of the target group are generated. The individuals of the target group are ranked based on said scores. A ranking list based is generated. The ranking list includes the individuals of the target group in a ranked order. The ranking list is stored.

19 Claims, 4 Drawing Sheets

(56) References Cited

U.S. PATENT DOCUMENTS

| | | | |
|---|---|---|---|
| 6,108,004 | A | 8/2000 | Medl |
| 6,826,541 | B1 | 11/2004 | Johnston et al. |
| 6,865,567 | B1 * | 3/2005 | Oommen et al. ............... 1/1 |
| 7,174,344 | B2 | 2/2007 | Campos et al. |
| 7,328,169 | B2 * | 2/2008 | Temares et al. .............. 705/7.33 |
| 7,421,458 | B1 | 9/2008 | Taylor et al. |
| 7,421,660 | B2 | 9/2008 | Charnock et al. |
| 7,428,541 | B2 | 9/2008 | Houle |
| 7,428,545 | B2 | 9/2008 | Bala |
| 7,428,546 | B2 | 9/2008 | Nori et al. |
| 7,660,737 | B1 | 2/2010 | Lim et al. |
| 7,949,565 | B1 * | 5/2011 | Eldering et al. ........... 705/14.49 |
| 7,991,578 | B2 | 8/2011 | Lee |
| 8,046,797 | B2 * | 10/2011 | Bentolila et al. ................ 725/46 |
| 8,095,419 | B1 | 1/2012 | Kapur |
| 2002/0010620 | A1 | 1/2002 | Kowalchuk et al. |
| 2002/0087388 | A1 | 7/2002 | Keil et al. |
| 2002/0194050 | A1 | 12/2002 | Nabe et al. |
| 2003/0009369 | A1 * | 1/2003 | Gorenstein ..................... 705/10 |
| 2003/0065805 | A1 | 4/2003 | Barnes |
| 2005/0065845 | A1 * | 3/2005 | DeAngelis ...................... 705/14 |
| 2006/0253469 | A1 | 11/2006 | Ramsey et al. |
| 2007/0112615 | A1 * | 5/2007 | Maga et al. ..................... 705/10 |
| 2007/0244741 | A1 | 10/2007 | Blume et al. |
| 2008/0052171 | A1 | 2/2008 | Elderling |
| 2008/0228703 | A1 * | 9/2008 | Kenedy et al. ................... 707/2 |
| 2010/0100420 | A1 | 4/2010 | Anderson et al. |

FOREIGN PATENT DOCUMENTS

| | | |
|---|---|---|
| WO | WO 2008045354 A2 * | 4/2008 |
| WO | WO 2008068716 A3 * | 4/2009 |

OTHER PUBLICATIONS

Blattberg, R. C., Getz, G., & Thomas, J. S. (2001). Managing customer acquisiton. Direct Marketing, 64(6), 41-54. Retrieved from http://search.proquest.com/docview/212825013?accountid=14753.*

Office Action (Mail Date Jul. 11, 2011) for U.S. Appl. No. 12/255,072, filed Oct. 21, 2008; Confirmation No. 2681.

Amendment filed Oct. 6, 2011 in response to Office Action (Mail Date Jul. 11, 2011) for U.S. Appl. No. 12/255,072, filed Oct. 21, 2008; Confirmation No. 2681.

Final Office Action (Mail Date Dec. 21, 2011) for U.S. Appl. No. 12/255,072, filed Oct. 21, 2008; Confirmation No. 2681.

Amendment and Request for Continued Examination filed Mar. 12, 2012 in response to Final Office Action (Mail Date Dec. 21, 2011) for U.S. Appl. No. 12/255,072, filed Oct. 21, 2008; Confirmation No. 2681.

Notice of Allowance (Mail Date Feb. 20, 2013) for U.S. Appl. No. 12/255,072, filed Oct. 21, 2008; Confirmation No. 2681.

Madeira et al.; Comparison of Target Selection Methods in Direct Marketing; European Symposium on Intelligent Technologies, Hybrid Systems and their Implementation on Smart Adaptive Systems; 2002; 6 pages.

Raaij et al.; The Implementation of Customer profitability analysis: A Case Study; Industrial Marketing Management, 2003; pp. 573-583.

* cited by examiner

TARGET MARKETING

This application is a continuation application claiming priority to Ser. No. 12/255,072, filed Oct. 21, 2008, now U.S. Pat. No. 8,473,327, issued Jun. 25, 2013.

FIELD

The present invention relates to a method and associated system for generating a ranked list of individuals for receiving specified marketing data.

BACKGROUND

Selecting parties for receiving specific information typically comprises an inefficient process with little flexibility. Accordingly, there exists a need in the art to overcome at least some of the deficiencies and limitations described herein above.

SUMMARY

The present invention provides a method comprising:

receiving, by a computing system, total population data comprising a list of individuals;

identifying, by said computing system, a first peer group of individuals from said total population data, wherein said first peer group is associated with products or services of a first marketing action;

presenting, by said computing system to an end user, a first graphical user interface (GUI) comprising original attribute selection criteria;

receiving, by said computing system from said end user in response to said original attribute selection criteria, first selection data indicating selections associated with said attribute selection criteria;

generating, by said computing system based on said first selection data, a first list comprising related attributes characterizing said first peer group, wherein said related attributes comprise a first group of attributes, a second group of attributes, and a third group of attributes, wherein said first group of attributes comprises attributes directly associated with said marketing action, wherein said second group of attributes comprises attributes associated with demographic data related to said first peer group, wherein said third group of attributes comprises attributes associated with additional purchasing habits of said first peer group of individuals, and wherein said additional purchasing habits are not associated with said marketing action;

identifying, by said computing system, a target group of individuals of said total population data, wherein said target group of individuals is predicted to be associated with said products or services of said first marketing action;

associating, by said computing system, said related attributes with said individuals of said target group;

generating, by said computing system based on said associating, scores associated with said individuals of said target group;

ranking, by said computing system, said individuals of said target group, wherein said ranking is based on said scores, and wherein said ranking indicates a status of each individual of said individuals of said target group with respect to each other individual of said individuals of said target group with respect to products or services of said marketing action;

generating, by said computing system, a ranking list based on said ranking, wherein said ranking list comprises said individuals of said target group in a ranked order; and storing, by said computing system, said ranking list.

The present invention provides a computing system computing system comprising a processor coupled to a computer-readable memory unit, said memory unit comprising instructions that when executed by the processor implements a ranking method, said method comprising:

receiving, by a computing system, total population data comprising a list of individuals;

identifying, by said computing system, a first peer group of individuals from said total population data, wherein said first peer group is associated with products or services of a first marketing action;

presenting, by said computing system to an end user, a first graphical user interface (GUI) comprising original attribute selection criteria;

receiving, by said computing system from said end user in response to said original attribute selection criteria, first selection data indicating selections associated with said attribute selection criteria;

generating, by said computing system based on said first selection data, a first list comprising related attributes characterizing said first peer group, wherein said related attributes comprise a first group of attributes, a second group of attributes, and a third group of attributes, wherein said first group of attributes comprises attributes directly associated with said marketing action, wherein said second group of attributes comprises attributes associated with demographic data related to said first peer group, wherein said third group of attributes comprises attributes associated with additional purchasing habits of said first peer group of individuals, and wherein said additional purchasing habits are not associated with said marketing action;

identifying, by said computing system, a target group of individuals of said total population data, wherein said target group of individuals is predicted to be associated with said products or services of said first marketing action;

associating, by said computing system, said related attributes with said individuals of said target group;

generating, by said computing system based on said associating, scores associated with said individuals of said target group;

ranking, by said computing system, said individuals of said target group, wherein said ranking is based on said scores, and wherein said ranking indicates a status of each individual of said individuals of said target group with respect to each other individual of said individuals of said target group with respect to products or services of said marketing action;

generating, by said computing system, a ranking list based on said ranking, wherein said ranking list comprises said individuals of said target group in a ranked order; and storing, by said computing system, said ranking list.

The present invention advantageously provides a simple method and associated system capable of selecting parties for receiving specific information.

DETAILED DESCRIPTION

Figure 1:
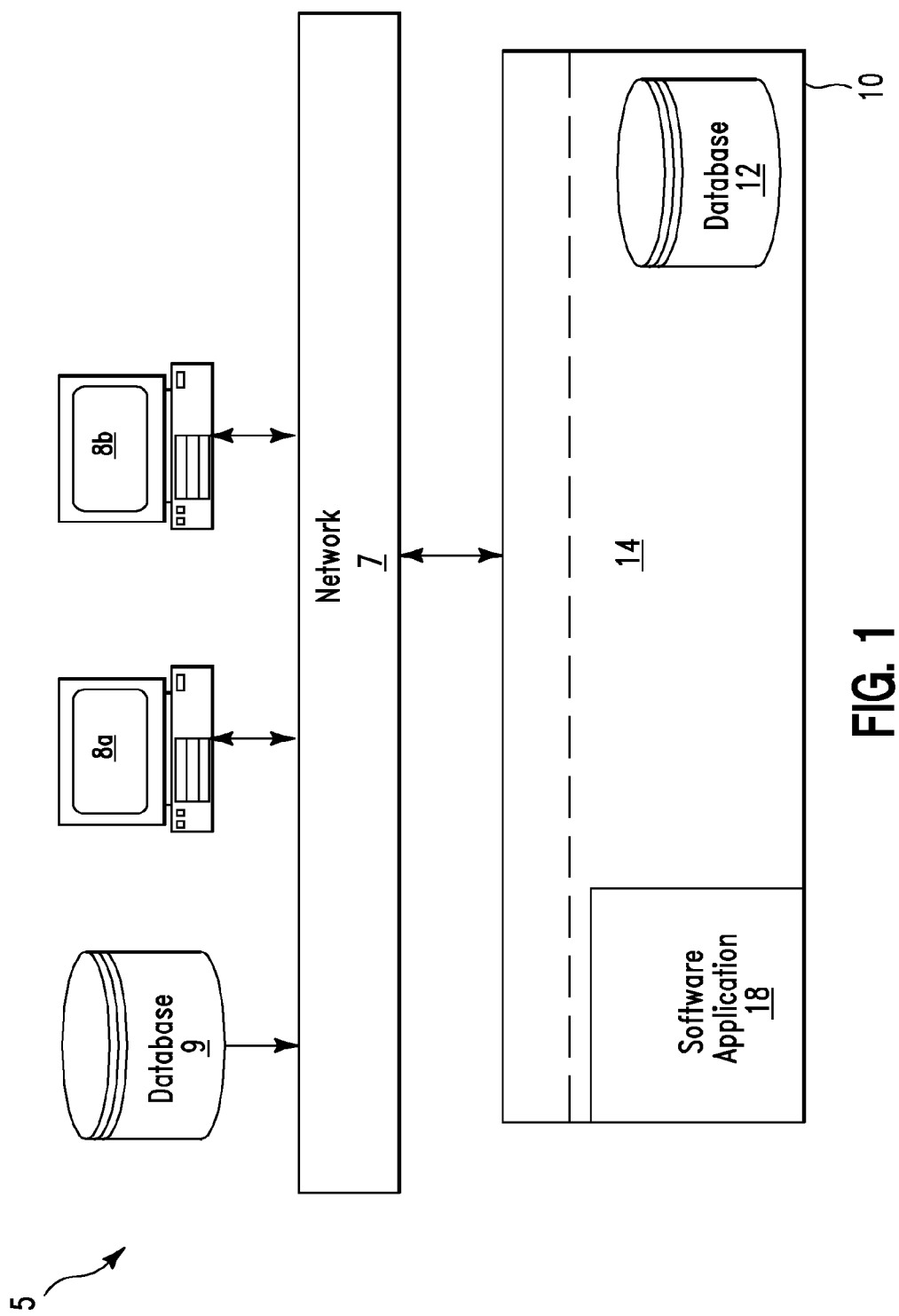
FIG. 1 illustrates a system for generating a ranked list of individuals for receiving specified marketing data, in accordance with embodiments of the present invention.

FIG. 1 illustrates a system 5 for generating a ranked list of individuals for receiving specified marketing data, in accordance with embodiments of the present invention. System 5 of FIG. 1 comprises a computing apparatus 8a, a computing apparatus 8b, and a database 9 connected to a computing system 10 through a network 7. Network 7 may comprise any type of network including, inter alia, a local area network, (LAN), a wide area network (WAN), the Internet, etc. Computing apparatus 8a and 8b may comprise any type of computing apparatus including, inter alia, a personal computer, a laptop computer, a computer terminal, etc. Computing apparatus 8a and 8b may comprise a single computing apparatus or a plurality of computing apparatuses. Computing apparatus 8a is used by end users (e.g., from a first entity or company) for selecting, overriding, and removing attributes (used for generating a marketing action) associated with a peer group of individuals or customers associated with or are the best prospects for the marketing action. A marketing action is defined herein as an offer for products, goods, or services. For example, a marketing action may comprise an offer for:
1. A specific brand of soft drink (product offer).
2. Performing a specified maintenance procedure on an automobile (service offer).

A marketing action may be divided into three categories:
1. A new sale—A new sale comprises generating interest in a good or service that has not been purchased before by the target individual.
2. A cross sale—A cross sale comprises generating interest in a co-related good (e.g., camping stoves and tents).
3. An up sale—An up sale comprises moving the targeted individual to a higher margin item.

Computing apparatus 8b is used by individuals and/or entities for receiving the marketing actions. Note that computing apparatus 8b comprises an example means (e.g., mail, television, radio, etc) for presenting the marketing action to the individuals and/or entities (e.g., via email) and that any means for presenting the marketing action may be used.

Database 9 comprises data used for the selection process for selecting individuals for receiving a marketing action. For example, database 9 may comprise total population data used for selecting peer groups and target groups of individuals, etc.

Computing system 10 may comprise any type of computing system(s) including, inter alia, a personal computer (PC), a server computer, a database computer, etc. Computing system 10 is used to retrieve data from database 9 and computing apparatus 8a for performing a selection process for selecting individuals for receiving a marketing action. Computing system 10 comprises a memory system 14. Memory system 14 may comprise a single memory system. Alternatively, memory system 14 may comprise a plurality of memory systems. Memory system 14 comprises a software application 16 and a database 12. Database 12 comprises all retrieved data (i.e., retrieved from computing apparatus 8a and database 9) and any generated data (e.g., ranking lists comprising selected individuals in a ranked order for receiving a marketing action).

Software application 18 performs a process for end user level target marketing and allowing the end user to utilize machine learning for target marketing. The process for end user level target marketing allows for any end user (i.e., having any skill level with respect to marketing) to generate ranking lists comprising selected individuals in a ranked order for receiving a marketing action ranked target group. The process for allowing the end user to generate ranking lists comprises the combination of three techniques:
1. An analytics department pre-process data. The data may be pre-processed by pre-scoring (e.g., using a batch method) all available attributes of a customer. The attributes may range from forty to one thousand individual observations about a transacting customer. The attributes may comprise age and gender spending habits over a given time period (e.g., one month, three months, twelve months etc).
2. An end user indicates the nature of an intended offer (i.e., a marketing action) by selecting attributes from a set of presented attribute indicators (e.g., placing check marks in a selected a set of boxes (i.e., comprising indicators for the attributes) on a graphical user interface (GUI)).
3. Computing system 10 uses the selected attributes to indicate key attributes. System 5 may utilizes a Euclidean distance equation to assert a distance from a customer record to each of the key attributes. This distance measurement is normalized in order to convert the measurement to in a range of zero to one thousand. 0 indicates no similarity and one thousand indicates an exact match with a specified criteria.

The pre-scoring process may comprise the following steps:
1. For each numeric variable a $75^{th}$ percentile or Q3 is located. Q2 or a $50^{th}$ percentile comprises a mean value. Each value for a given variable is normalized to a range 0-1000 and 1000 is mapped to the 75th percentile. The following equation illustrates a normalization equation for generating a desired answer:

$$\frac{\alpha^1 - \beta^1}{\alpha - \beta}(x - \beta) + \beta^1$$

Where:
$\alpha$=maximum of original range.
$\beta$=minimum of original range.
$\alpha^1$=maximum of new range which is 1000.
$\beta^1$=minimum of new range which is 0.
2. If values exceed Q3 then they are capped to Q3.
3. A vector for each customer for each available attribute is computed giving an indication of the strength of purchase behavior in that element.
4. Missing attributes (e.g., age) are handled by binning into ranges of a convenient range (e.g., 5 years). For these variables, the probability distribution is utilized as a way of handling missing values. Thus the number would give an indication of the probability of the unknown in a particular bin.
5. Missing attributes in alternative categories (e.g., relating to purchase behavior) comprise a value of zero indicating a purchase may mislead an end result.

The process for allowing the end user to utilize machine learning for target marketing comprises formulating a query to use a threshold technique to find predominate attributes of a customer set. Generated thresholds are used to select attributes from a set of presented attribute indicators (e.g., placing check marks in a selected a set of boxes on a graphical user interface (GUI)). If the end users believe anything additional data is pertinent to the target marketing offer then additional indicators are enabled. Computing system 10 performs a target marketing process as follows:
1. A marketing action is generated by producing a database query (i.e., visually or linguistically).

2. The query is submitted and an array of attributes is examined.
3. An average value for each attribute for all customers selected by the query is determined. The average values are determined in a range of zero to one thousand so therefore an arbitrary threshold (e.g., 220) may be selected. Each attribute value which exceeds the arbitrary threshold may be considered a significant value. Additional sophisticated techniques to determine a threshold may be used. For example, selected values which exceed the $75^{th}$ percentile for a range of attributes in a subset may be used as a threshold.

Software application 16 performs the following functions associated with generating a ranked list of individuals for receiving specified marketing data:
1. Identifies a segment (i.e., set of customers) of an overall known population that most closely resembles a marketing action or offer. The set of customers is defined as a peer group.
2. Obtains a list of significant attributes characterizing the peer group.
3. Identifies a target group of individuals from the overall known population for the marketing action or offer.
4. Matches the significant attributes (in a fuzzy manner) to the target group of individuals to produce a score.
5. Ranks the target group of individuals and chooses individuals with the highest scores (i.e., high scores are associated with having a highest affinity with marketing action or offer) to receive the marketing action or offer.

The following examples illustrate implementation examples for generating a ranked list of individuals for receiving specified marketing data:

Example 1

Example 1 illustrates an example for presenting an offer for marketing a new organic beer product. A target segment comprises 21-30 year old males who currently buy premium beer. A peer group from the target segment comprises 21-30 year old males that average spending $28.00 per month on premium beer. Significant attributes for the peer group comprise:
1. Male (1000 average score)
2. Age 21 to 30 (1000 average score)
3. Snacks (500 average score)
4. Football shirts (400 average score)
5. Auto products (600 average score)
6. Household income less than $20,000 annually (800 average score)
7. Nappies (200 average score)

An override is enabled with respect to the selected attributes comprising average spending in the last three months for organic products. A target group of individuals is identified based on the following criteria:
1. The marketing action is being implemented in Chicago.
2. The marketing action is limited to 2000 individuals.

The average scores are sorted in descending order and any customers living in Chicago that comprise a top scores (e.g., scores of 800+) are selected (i.e., a target group) and these customers (i.e., a target group) are contacted with the marketing action.

Example 2

Example 2 illustrates an example for building an attrition model for a DIY store.
A target segment comprises customers who spent over $200 two months ago and have spent less than $10 in the last month.

A peer group associated with the above described spending habits is generated. Significant attributes for the peer group comprise:
Male (1000 average score)
Age 40 to 50 (1000 average score)
Paint and decorating (500 average score)
Gas spend (400 average score)
Milk and diary (600 average score)
Household income greater than $10,000 annually (800 average score)
Tires (200 average score)

No overrides are necessary during this process. A target group of individuals is identified based on the following criteria:
1. The marketing action is implanted for store #55 only.
2. The marketing action is limited to 1200 individuals.

The average scores are sorted in descending order and any customers living near store #55 that comprise top scores (e.g., scores of 800+) are selected (i.e., a target group) and these customers (i.e., a target group) are contacted with the marketing action.

Figure 2:
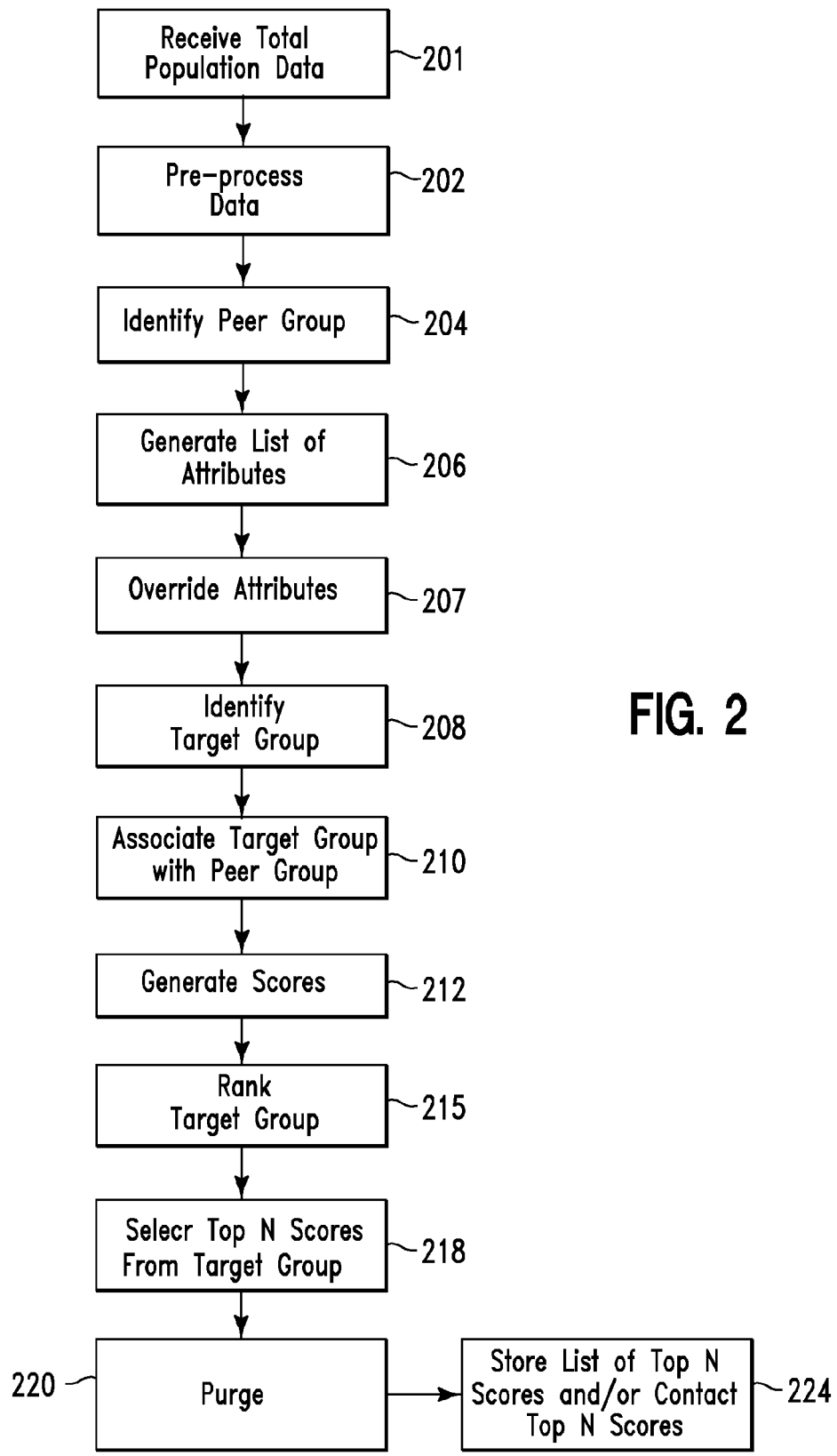
FIG. 2 illustrates a flowchart describing an algorithm used by the system of FIG. 1 for generating a ranked list of individuals for receiving specified marketing data, in accordance with embodiments of the present invention.

FIG. 2 illustrates a flowchart describing an algorithm used by system 5 of FIG. 1 for generating a ranked list of individuals for receiving specified marketing data, in accordance with embodiments of the present invention. In step 201, a computing system (e.g., computing system 5 of FIG. 1) receives total population data (i.e., comprising a list of individuals). The total population data may be received from a database (e.g., database 9 in FIG. 1). The total population data comprises individuals that may be candidates for a marketing action. In step 202, the total population data is preprocessed. Preprocessing the total population data may comprise retrieving data associated with the individuals from the total population data (e.g., purchase lists, income data, ages, demographic data, etc), receiving selections for first attributes associated with the data, scoring the first attributes, and normalizing the scores. In step 204, a peer group of individuals from the total population data is selected. The peer group is associated with products or services of a marketing action. In step 206, a list of related attributes (i.e., attributes selected from the first attributes) is generated. The related attributes characterize the peer group identified in step 204. The related attributes comprise significant variables (i.e., significance) associated with the peer group. Significance is defined by the following two methods:
1. Non missing values: For example, at least one third of the peer group for a given variable must be valued for it to be considered for a spread test. (i.e., not have a missing value).
2. A spread test comprises a method of considering a distribution of the values. If variable is spread out then it is not significant. For example, a user may look for variables where all the peers are within 20% of each other.

A mean value for the variable, the non missing values, and the spread test are used to determining a significance of the variable. A mean value is used to generate a single point in the distribution if a user self selects or overrides a variable into the pattern matching set.

The related attributes may comprise a first group of attributes, a second group of attributes, and a third group of attributes. The first group of attributes comprises attributes directly associated with the marketing action. The second group of attributes comprises attributes associated with demographic data (location data, age data, etc) related to the first peer group. The third group of attributes comprises attributes associated with additional purchasing habits of the first peer group. The additional purchasing habits are not associated with the marketing action. For example, if the marketing action comprises an offer for an organic beer product, the additional purchasing habits may include past purchasing habits (i.e., for the individuals of the peer group) for products such as, inter alia, organic foods, beverages, snack foods, meals, etc. Generating the list of attributes may comprise presenting (i.e., to an end user) a graphical user interface (GUI) comprising attribute selection criteria and receiving (i.e., from an end user in response to the attribute selection criteria) selection data indicating selections associated with the attribute selection criteria. The attribute selection criteria may comprise an attribute indicator selection mechanism for allowing the end user to enable attributes associated with each attribute indicator. For example, the attribute indicator selection mechanism may comprise a presented list of attributes (i.e., presented on a computer monitor) and check boxes adjacent to each attribute so that the user may place check marks (i.e., selection data) in boxes for selected attributes. In optional step 207, the end user may modify or override the any of the related attributes characterizing the peer group. The end user may command the computing system to remove at least one of the related attributes from the list. Alternatively, the end user may command the computing system to add at least one new attribute characterizing the peer group to the list. The at least one new attribute may be inputted by the end user or the at least one new attribute may be selected by the end user (i.e., in response to a new attributes list presented to the end user by the computing system). In step 208, a target group of individuals is selected from the total population data. The target group of individuals is selected based on associations with the products or services associated with the marketing action. In step 210, the target group is associated with the related attributes of the peer group. In step 212, scores associated with the individuals of the target group are generated. The scores are generated based on the associations of step 210. In step 215, the individuals of the target group are ranked according to the scores (e.g. a score of 1000 is ranked higher than a score of 800). The computing system may generate a ranking list comprising the ranked individuals. The ranking list indicates a status of each individual of the target group with respect to each other and with respect to the products or services of the marketing action. In step 218, a preferred group of individuals (i.e., comprising the top N scores) of the target group is selected. A modified ranking list comprising the preferred group in a ranked order may be generated. In step 220, any individuals that are not selected as part of the preferred group are purged or removed from the computing system. In step 224, the modified list is stored and the individuals on the modified list are contacted with the marketing action.

Figure 3:
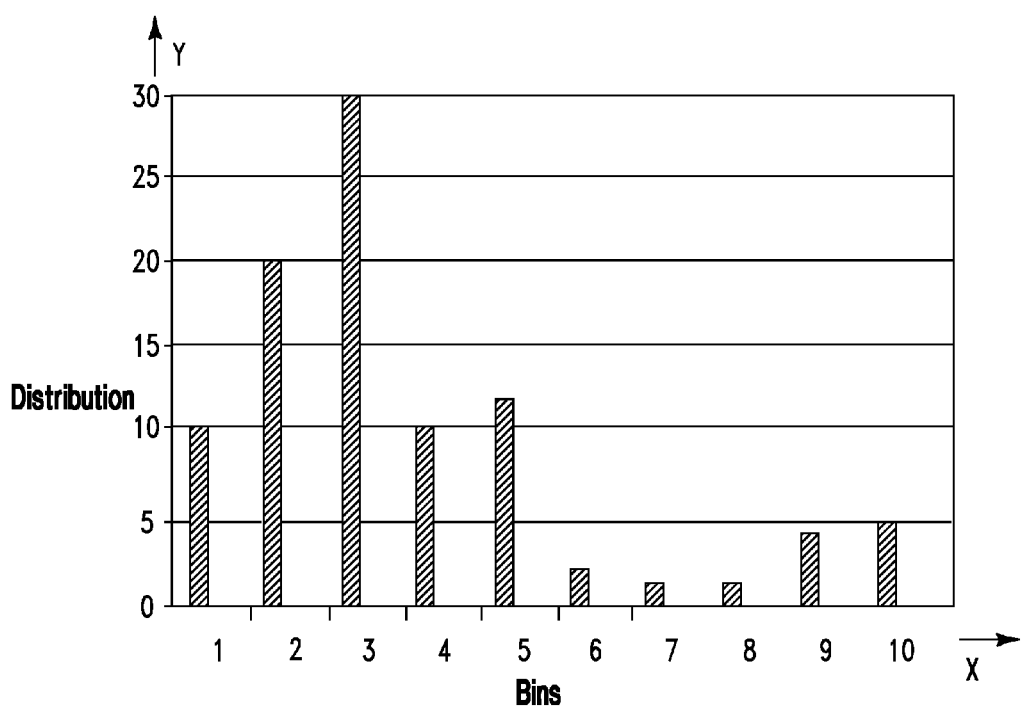
FIG. 3 illustrates a histogram a distribution of individuals in a peer group, in accordance with embodiments of the present invention.

FIG. 3 illustrates a histogram a distribution of individuals in a peer group, in accordance with embodiments of the present invention. The X-axis represents the distribution of the individuals in the peer group. The Y-axis represents a number of bins. Each bin comprises a number of values an associated range for each distribution. The following steps described with respect to the histogram of FIG. 3 illustrate an implementation example for performing a significance calculation:

1. A total count for the value of the distribution=95.
2. It is determined that 95 is greater than one third of total values in peer group (i.e., 95 entries).
3. The significance is set to equal 9.
4. 80% of 95 is calculated (i.e., 76).
5. A largest bin is selected (i.e., bin 3=30).
6. It is determined that 30 is not greater than or equal to 80% (i.e., 76%).
7. It is determined that there is a bin to the left of bin 3.
8. The significance is set to equal 8.
9. The two bins are totalled (i.e., 30+20=50).
10. It is determined that 50 is not greater than or equal to 80% (i.e., 76%).
11. It is determined that there is a bin to the right of bin 3.
12. The significance is set to equal 7.
13. The three bins are totalled (i.e., 30+20+10=60).
14. It is determined that 60 is not greater than or equal to 80% (i.e., 76%).
15. It is determined that there is two bins to the left of bin 3.
16. The significance is set to equal 6.
17. The four bins are totalled (i.e., 30+20+10+10=70).
18. It is determined that 70 is not greater than or equal to 80% (i.e., 76%).
19. It is determined that there is two bins to the right of bin 3.
20. The significance is set to equal 5.
21. The five bins are totalled (i.e., 30+20+10+10+12=82).
22. It is determined that 70 is greater than 80% (i.e., 82%).
23. The significance is permanently set to equal 5.

Figure 4:
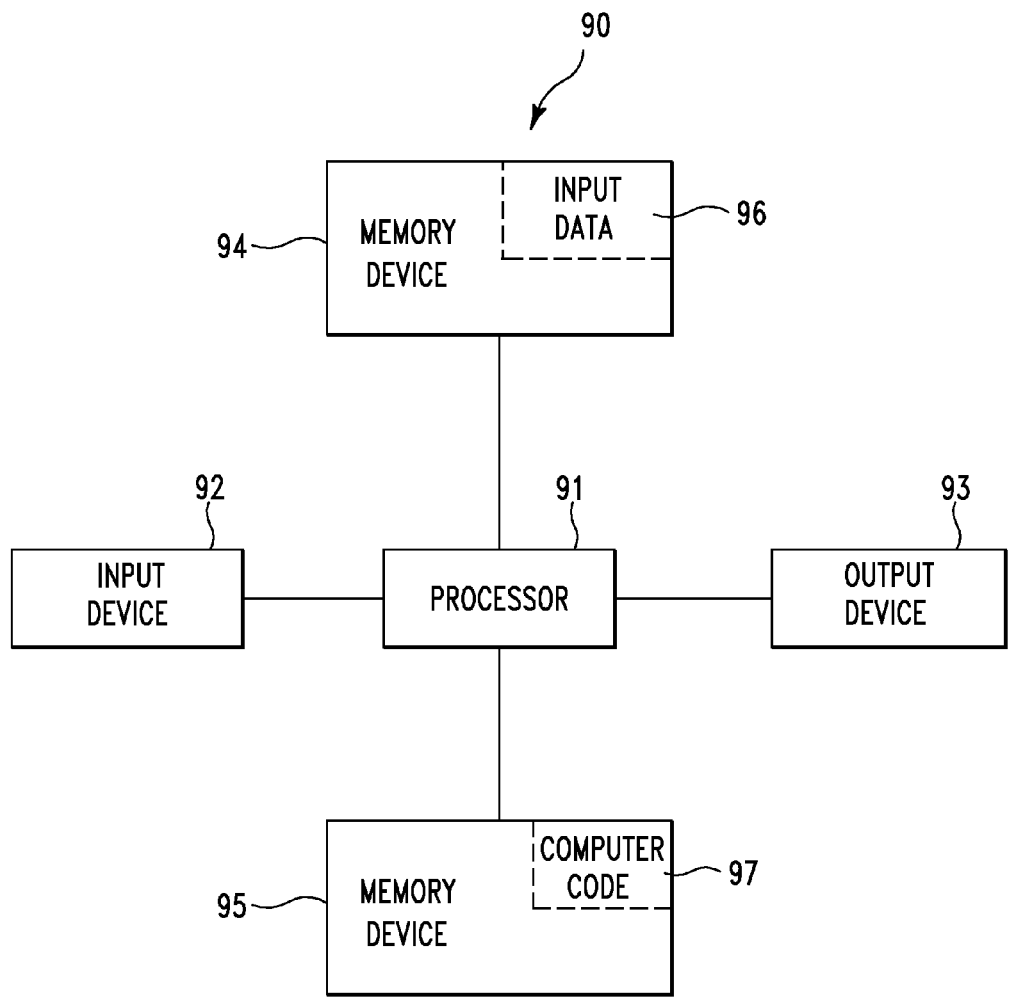
FIG. 4 illustrates a computer apparatus used for generating a ranked list of individuals for receiving specified marketing data, in accordance with embodiments of the present invention.

FIG. 4 illustrates a computer apparatus 90 (e.g., computing system 10 of FIG. 1) used for generating a ranked list of individuals for receiving specified marketing data, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for generating a ranked list of individuals for receiving specified marketing data. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to for generate a ranked list of individuals for receiving specified marketing data. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for generating a ranked list of individuals for receiving specified marketing data. In another embodiment, the invention provides a business method that performs the process steps of the invention on a subscription, advertising, and/or fee basis. That is, a service provider, such as a Solution Integrator, could offer to generate a ranked list of individuals for receiving specified marketing data. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:

receiving, by a computing system, total population data comprising a list of individuals;

identifying, by said computing system, a first peer group of individuals from said total population data, wherein said first peer group is associated with products or services of a first marketing action;

presenting, by said computing system to an end user, a first graphical user interface (GUI) comprising original attribute selection criteria;

receiving, by said computing system from said end user in response to said original attribute selection criteria, first selection data indicating selections associated with said attribute selection criteria;

generating, by a computer processor of said computing system based on said first selection data, a first list comprising related attributes characterizing said first peer group, wherein the related attributes consist of an age and gender spending habits of said first peer group over a given time period, wherein said related attributes comprise a first group of attributes, a second group of attributes, and a third group of attributes, wherein said first group of attributes comprises attributes directly associated with said marketing action, wherein said second group of attributes comprises attributes associated with demographic data related to said first peer group, wherein said third group of attributes comprises attributes associated with additional purchasing habits of said first peer group of individuals, and wherein said additional purchasing habits are not associated with said marketing action;

enabling, by said computing system in response to a command from said end user, an override resulting in removal a first attribute of the related attributes from the first list;

generating, by said computing system, a second list comprising said related attributes associated with said first peer group except said first attribute;

selecting, by said computing system, said related attributes from said second list, wherein said selecting is based on data associated with said total population data, and wherein said selecting said related attributes from said second list comprises:

calculating, by said computing system, a significance index value for each related attribute of said related attributes, wherein said calculating said significance index value for each said related attribute of said related attributes comprises:

determining, by said computing system, associated bin counts comprising normalized values for all said attributes associated with said first peer group;

calculating, by said computing system, a number of records associated with calculating mean values;

modifying, by said computing system, said associated bin counts by selecting specified bins located to the left and to the right of a specified bin and totaling said specified bins;

determining, by said computing system, multiple temporary significance index values based on said totaling said specified bins;

determining, by said computing system, that a value generated during said totaling said specified bins is greater than a specified percentage; and setting, by said computing system, one value of said multiple temporary significance index values as said significance index value;

identifying, by said computing system, a target group of individuals of said total population data, wherein said target group of individuals is predicted to be associated with said products or services of said first marketing action;

associating, by said computing system, said related attributes with said individuals of said target group;

generating, by said computing system based on said associating, scores associated with said individuals of said target group;

calculating, by said computing system executing a Euclidean distance equation, normalized distance values between said target group of individuals and said related attributes;

capping, by said computing system, said normalized distance values at a specified percentile value;

computing, by said computing system, a vector for each individual of said group of individuals, wherein each said vector indicates a strength of purchase behavior for each said individual;

ranking, by said computing system, said individuals of said target group, wherein said ranking is based on said scores, and wherein said ranking indicates a status of each individual of said individuals of said target group with respect to each other individual of said individuals of said target group with respect to products or services of said marketing action;

generating, by said computing system, a ranking list based on said ranking, wherein said ranking list comprises said individuals of said target group in a ranked order.

2. The method of claim 1, further comprising:

selecting, by said computing system, a preferred group of individuals of said individuals of said target group, wherein said preferred group of individuals are associated with higher scores of said scores than all other individuals of said individuals of said target group;

generating, by said computing system, a modified ranking list from said ranking list such, wherein said modified ranking list consists of said preferred group of individuals in said ranked order;

storing, by said computing system, said modified ranking list; and transmitting, by said computing system to said preferred group of individuals, said first marketing action.

3. The method of claim 1, wherein said selecting said related attributes from said second list comprises:

determining, by said computing system, a $75^{th}$ percentile of all said attributes associated with said first peer group; and normalizing, by said computing system, all said attributes associated with said first peer group with respect to attributes associated with said $75^{th}$ percentile.

4. The method of claim 1, wherein said scores associated with said individuals of said target group indicate a relationship between said individuals of said target group and said first peer group of individuals.

5. The method of claim 1, further comprising:

receiving, by said computing system from said end user, second selection data associated with said related attributes characterizing said first peer group; and before said associating said related attributes, modifying, by said computing system based on said second selection data, said first list comprising said related attributes characterizing said first peer group.

6. The method of claim 5, wherein said modifying said first list comprises:

removing, by said computing system from said first list, at least one attribute of said related attributes characterizing said first peer group, wherein said related attributes do not comprise said least one attribute.

7. The method of claim 5, wherein said modifying said first list comprises:

adding, by said computing system to said first list, at least one new attribute characterizing said first peer group, wherein said related attributes comprises said least one new attribute.

8. The method of claim 1, further comprising:

before said generating said first list, receiving by said computing system from said end user, a request for detailed attribute selection criteria associated with said original attribute selection criteria;

presenting, by said computing system to said end user in response to said request, a second (GUI) comprising said detailed attribute selection criteria; and receiving, by said computing system from said end user in response to said detailed attribute selection criteria, second selection data indicating selections associated with said detailed attribute selection criteria, wherein said generating said first list is further based on said second selection data.

9. The method of claim 1, wherein said original attribute selection criteria is presented to said end user as a plurality of attribute indicators, and wherein each attribute indicator of said plurality of attribute indicators comprises an attribute indicator selection mechanism for allowing said end user to enable attributes associated with each said attribute indicator.

10. A computer program product, comprising a program storage device having a computer readable program code stored therein, said computer readable program code comprising an algorithm that when executed by a computer processor of a computing system implements a method comprising:

receiving, by said computing system, total population data comprising a list of individuals;

identifying, by said computing system, a first peer group of individuals from said total population data, wherein said first peer group is associated with products or services of a first marketing action;

presenting, by said computing system to an end user, a first graphical user interface (GUI) comprising original attribute selection criteria;

receiving, by said computing system from said end user in response to said original attribute selection criteria, first selection data indicating selections associated with said attribute selection criteria;

generating, by a computer processor of said computing system based on said first selection data, a first list comprising related attributes characterizing said first peer group, wherein the related attributes consist of an age and gender spending habits of said first peer group over a given time period, wherein said related attributes comprise a first group of attributes, a second group of attributes, and a third group of attributes, wherein said first group of attributes comprises attributes directly associated with said marketing action, wherein said second group of attributes comprises attributes associated with demographic data related to said first peer group, wherein said third group of attributes comprises attributes associated with additional purchasing habits of said first peer group of individuals, and wherein said additional purchasing habits are not associated with said marketing action;

enabling, by said computing system in response to a command from said end user, an override resulting in removal a first attribute of the related attributes from the first list;

generating, by said computing system, a second list comprising said related attributes associated with said first peer group except said first attribute;

selecting, by said computing system, said related attributes from said second list, wherein said selecting is based on data associated with said total population data, and wherein said selecting said related attributes from said second list comprises:

calculating, by said computing system, a significance index value for each related attribute of said related attributes, wherein said calculating said significance index value for each said related attribute of said related attributes comprises:

determining, by said computing system, associated bin counts comprising normalized values for all said attributes associated with said first peer group;

calculating, by said computing system, a number of records associated with calculating mean values;

modifying, by said computing system, said associated bin counts by selecting specified bins located to the left and to the right of a specified bin and totaling said specified bins;

determining, by said computing system, multiple temporary significance index values based on said totaling said specified bins;

determining, by said computing system, that a value generated during said totaling said specified bins is greater than a specified percentage; and setting, by said computing system, one value of said multiple temporary significance index values as said significance index value;

identifying, by said computing system, a target group of individuals of said total population data, wherein said target group of individuals is predicted to be associated with said products or services of said first marketing action;

associating, by said computing system, said related attributes with said individuals of said target group;

generating, by said computing system based on said associating, scores associated with said individuals of said target group;

calculating, by said computing system executing a Euclidean distance equation, normalized distance values between said target group of individuals and said related attributes;

capping, by said computing system, said normalized distance values at a specified percentile value;

computing, by said computing system, a vector for each individual of said group of individuals, wherein each said vector indicates a strength of purchase behavior for each said individual;

ranking, by said computing system, said individuals of said target group, wherein said ranking is based on said scores, and wherein said ranking indicates a status of each individual of said individuals of said target group with respect to each other individual of said individuals of said target group with respect to products or services of said marketing action;

generating, by said computing system, a ranking list based on said ranking, wherein said ranking list comprises said individuals of said target group in a ranked order.

11. A computing system comprising a processor coupled to a program storage device having computer readable program code stored therein, storing instructions that when executed by the processor implements a ranking method, said method comprising:

receiving, by said computing system, total population data comprising a list of individuals;

identifying, by said computing system, a first peer group of individuals from said total population data, wherein said first peer group is associated with products or services of a first marketing action;

presenting, by said computing system to an end user, a first graphical user interface (GUI) comprising original attribute selection criteria;

receiving, by said computing system from said end user in response to said original attribute selection criteria, first selection data indicating selections associated with said attribute selection criteria;

generating, by a computer processor of said computing system based on said first selection data, a first list comprising related attributes characterizing said first peer group, wherein the related attributes consist of an age and gender spending habits of said first peer group over a given time period, wherein said related attributes comprise a first group of attributes, a second group of attributes, and a third group of attributes, wherein said first group of attributes comprises attributes directly associated with said marketing action, wherein said second group of attributes comprises attributes associated with demographic data related to said first peer group, wherein said third group of attributes comprises attributes associated with additional purchasing habits of said first peer group of individuals, and wherein said additional purchasing habits are not associated with said marketing action;

enabling, by said computing system in response to a command from said end user, an override resulting in removal a first attribute of the related attributes from the first list;

generating, by said computing system, a second list comprising said related attributes associated with said first peer group except said first attribute;

selecting, by said computing system, said related attributes from said second list, wherein said selecting is based on data associated with said total population data, and wherein said selecting said related attributes from said second list comprises:

calculating, by said computing system, a significance index value for each related attribute of said related attributes, wherein said calculating said significance index value for each said related attribute of said related attributes comprises:

determining, by said computing system, associated bin counts comprising normalized values for all said attributes associated with said first peer group;

calculating, by said computing system, a number of records associated with calculating mean values;

modifying, by said computing system, said associated bin counts by selecting specified bins located to the left and to the right of a specified bin and totaling said specified bins;

determining, by said computing system, multiple temporary significance index values based on said totaling said specified bins;

determining, by said computing system, that a value generated during said totaling said specified bins is greater than a specified percentage; and setting, by said computing system, one value of said multiple temporary significance index values as said significance index value;

identifying, by said computing system, a target group of individuals of said total population data, wherein said target group of individuals is predicted to be associated with said products or services of said first marketing action;

associating, by said computing system, said related attributes with said individuals of said target group;

generating, by said computing system based on said associating, scores associated with said individuals of said target group;

calculating, by said computing system executing a Euclidean distance equation, normalized distance values between said target group of individuals and said related attributes;

capping, by said computing system, said normalized distance values at a specified percentile value;

computing, by said computing system, a vector for each individual of said group of individuals, wherein each said vector indicates a strength of purchase behavior for each said individual;

ranking, by said computing system, said individuals of said target group, wherein said ranking is based on said scores, and wherein said ranking indicates a status of each individual of said individuals of said target group with respect to each other individual of said individuals of said target group with respect to products or services of said marketing action;

generating, by said computing system, a ranking list based on said ranking, wherein said ranking list comprises said individuals of said target group in a ranked order.

12. The computing system of claim 11, wherein said method further comprises:

selecting, by said computing system, a preferred group of individuals of said individuals of said target group, wherein said preferred group of individuals are associated with higher scores of said scores than all other individuals of said individuals of said target group;

generating, by said computing system, a modified ranking list from said ranking list such, wherein said modified ranking list consists of said preferred group of individuals in said ranked order;

storing, by said computing system, said modified ranking list; and transmitting, by said computing system to said preferred group of individuals, said first marketing action.

13. The computing system of claim 11, wherein said selecting said related attributes from said second list comprises:

determining, by said computing system, a $75^{th}$ percentile of all said attributes associated with said first peer group; and normalizing, by said computing system, all said attributes associated with said first peer group with respect to attributes associated with said $75^{th}$ percentile.

14. The computing system of claim 11, wherein said method further comprises:

receiving, by said computing system from said end user, second selection data associated with said related attributes characterizing said first peer group; and before said associating said related attributes, modifying, by said computing system based on said second selection data, said first list comprising said related attributes characterizing said first peer group.

15. The computing system of claim 14, wherein said modifying said first list comprises:

removing, by said computing system from said first list, at least one attribute of said related attributes characterizing said first peer group, wherein said related attributes do not comprise said least one attribute.

16. The computing system of claim 14, wherein said modifying said first list comprises:

adding, by said computing system to said first list, at least one new attribute characterizing said first peer group, wherein said related attributes comprises said least one new attribute.

17. The computing system of claim 11, wherein said method further comprises:

before said generating said first list, receiving by said computing system from said end user, a request for detailed attribute selection criteria associated with said original attribute selection criteria;

presenting, by said computing system to said end user in response to said request, a second (GUI) comprising said detailed attribute selection criteria; and receiving, by said computing system from said end user in response to said detailed attribute selection criteria, second selection data indicating selections associated with said detailed attribute selection criteria, wherein said generating said first list is further based on said second selection data.

18. The computing system of claim 11, wherein said original attribute selection criteria is presented to said end user as a plurality of attribute indicators, and wherein each attribute indicator of said plurality of attribute indicators comprises an attribute indicator selection mechanism for allowing said end user to enable attributes associated with each said attribute indicator.

19. The computing system of claim 11, wherein said scores associated with said individuals of said target group indicate a relationship between said individuals of said target group and said first peer group of individuals.

* * * * *